United States Patent
Kim

(10) Patent No.: US 10,024,367 B2
(45) Date of Patent: Jul. 17, 2018

(54) DRIVE MOTOR CAPABLE OF BEING SEPARATED FROM ROTATION MEMBER WHEN ROTATION MEMBER IS RESTRAINED

(71) Applicant: Hyundai Motor Company, Seoul (KR)

(72) Inventor: Tae-Wan Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/376,967

(22) Filed: Dec. 13, 2016

(65) Prior Publication Data

US 2018/0073567 A1 Mar. 15, 2018

(30) Foreign Application Priority Data

Sep. 12, 2016 (KR) .......................... 10-2016-0117237

(51) Int. Cl.
*F16D 7/04* (2006.01)
*H02K 7/00* (2006.01)

(52) U.S. Cl.
CPC ............. *F16D 7/048* (2013.01); *H02K 7/003* (2013.01)

(58) Field of Classification Search
CPC . F16D 7/00; F16D 7/002; F16D 7/048; F16D 43/2028; H02K 7/003; H02K 9/06; H02K 9/24
USPC ................... 464/37; 192/55.1, 56.1
See application file for complete search history.

(56) References Cited

U.S. PATENT DOCUMENTS

| | | | | |
|---|---|---|---|---|
| 3,589,486 A * | 6/1971 | Kelch | ..................... | F16D 41/18 |
| | | | | 192/46 |
| 4,006,787 A * | 2/1977 | Rumpp | ................. | B23B 31/005 |
| | | | | 464/37 |
| 4,570,769 A * | 2/1986 | Isaka | ....................... | F16D 41/12 |
| | | | | 192/107 T |
| 5,000,721 A * | 3/1991 | Williams | ................ | F16D 7/048 |
| | | | | 464/37 |
| 5,601,491 A * | 2/1997 | Chan | ....................... | F16D 7/048 |
| | | | | 464/37 |
| 7,954,857 B2 * | 6/2011 | Helstern | ................. | F16L 19/00 |
| | | | | 285/36 |
| 9,568,571 B2 * | 2/2017 | Rapoport | ................ | F16D 7/048 |

FOREIGN PATENT DOCUMENTS

| | | | | |
|---|---|---|---|---|
| EP | 2031263 A2 * | 3/2009 | ............. | F16D 7/002 |
| FR | 2466666 A1 * | 4/1981 | ............. | F16D 7/048 |
| JP | H10-252771 A | 9/1998 | | |

(Continued)

*Primary Examiner* — Josh Skroupa
(74) *Attorney, Agent, or Firm* — Morgan, Lewis & Bockius LLP

(57) ABSTRACT

A drive motor capable of being separated from a rotation member when the rotation member is restrained, the drive motor being configured to be coupled with the rotation member to transmit rotating force to the rotation member, and may include a power transmission control device provided on a junction between the drive motor and the rotation member and configured such that the rotating force can be transmitted from the drive motor to the rotation member, and such that when the rotation member is restrained and rotation thereof is not allowed, the power transmission control device is elastically deformed so that the coupling of the rotation member with the drive motor is released and only the drive motor is allowed to be rotated.

8 Claims, 12 Drawing Sheets

(56) References Cited

FOREIGN PATENT DOCUMENTS

| JP | 2007288871 A | 11/2007 |
|---|---|---|
| JP | 3183230 U | 4/2013 |
| KR | 20-0310238 Y1 | 4/2003 |
| KR | 10-2008-0030148 A | 4/2008 |

\* cited by examiner

DRIVE MOTOR CAPABLE OF BEING SEPARATED FROM ROTATION MEMBER WHEN ROTATION MEMBER IS RESTRAINED

CROSS-REFERENCE TO RELATED APPLICATIONS

The present application claims priority to Korean Patent Application No. 10-2016-0117237, filed on Sep. 12, 2016, the entire contents of which is incorporated herein for all purposes by this reference.

BACKGROUND OF THE INVENTION

Field of the Invention

Exemplary embodiments of the present invention relate to a drive motor capable of being separated from a rotation member when the rotation member is restrained; and, particularly to a drive motor that is configured such that when rotation of the rotation member is restrained, the rotation member is separated from the drive motor to prevent overcurrent from being applied to the drive motor.

Description of Related Art

Generally, a drive motor includes a rotating shaft to which a rotating member is coupled. When power is applied to the drive motor, the rotating force of the drive motor is transmitted to the rotating member through the rotating shaft, thus rotating the rotating member. For example, to rotate a cooling fan of a vehicle, the cooling fan is coupled with a rotating shaft of a fan motor such that when the fan motor is operated, the cooling fan is rotated.

FIG. 1 illustrates the coupling of a rotating member to a drive motor according to a conventional art. Referring to this, to couple the rotating member 20 with an end of the rotating shaft 11 of the drive motor 10, a locking clip 131 of the rotating member 20 is used such that the rotating member 20 is fixed to the rotating shaft 11. After a coupling plate 132 provided with a locking protrusion is fixed to the rotating member 20, the rotating shaft 11 is locked to the coupling plate 132 by the locking clip 131. Thereby, the drive motor can rotate the rotating member 20.

However, when the rotation of the rotating member 20 is in a restrained state, overcurrent may be applied to the drive motor 10 that is coupled to the rotating member 20 such that the drive motor 10 and the rotation member 20 are integrally rotated. In this case, the drive motor may be damaged by heat or a fire may occur.

The drive motor and the rotation member may be respectively used as a fan motor and a cooling fan for a vehicle. For instance, when the vehicle is used in an intense cold area, the cooling fan 20 may freeze due to a low temperature in the winter, whereby the rotation of the cooling fan 20 may be restrained. Because the cooling fan 20 and the fan motor 10 are coupled to each other such that they are integrally rotated, if the cooling fan 20 is restrained by freezing or the like, the rotation of the fan motor 10 is also restrained. In this case, overcurrent may be applied to the fan motor 10, whereby the fan motor 10 may be damaged by heat or a fire may occur on the fan motor 10.

Furthermore, in the case where foreign substances enter the cooling fan 20, the rotation of the cooling fan 20 may also be restrained by the foreign substances. Even in this case, the fan motor 10 may be damaged by heat or a fire may occur on the fan motor 10.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a drive motor capable of being separated from a rotation member when the rotation member is restrained, which is configured such that when rotation of the rotation member is restrained, the rotation member is separated from the drive motor to prevent burning damage to the drive motor or occurrence of a fire caused by overcurrent.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, there is provided a drive motor capable of being separated from a rotation member when the rotation member is restrained, the drive motor being configured to be coupled with the rotation member to transmit rotating force to the rotation member, and including: a power transmission control device provided on a junction between the drive motor and the rotation member and configured such that the rotating force can be transmitted from the drive motor to the rotation member, and such that when the rotation member is restrained and rotation thereof is not allowed, the power transmission control device is elastically deformed so that the coupling of the rotation member with the drive motor is released and only the drive motor is allowed to be rotated.

The power transmission control device may be coupled to a rotation shaft of the drive motor and integrally rotated along with the rotation shaft. The power transmission control device may be coupled to the rotation member and configured such that when the rotation member is in an unrestrained state, the rotating force of the drive motor is transmitted to the rotation member, and when the rotation member is in a restrained state, the power transmission control device is elastically deformed so that the coupling of the power transmission control device with the rotation member is released.

When the rotation member is changed from the restrained state to the unrestrained state, the power transmission control device may be elastically restored and enable the rotating force of the drive motor to be transmitted to the rotation member.

The power transmission control device may include: a coupling clip including a frame part having a polygonal shape and coupled with the rotation member, a pair of cut extension portions formed by cutting a portion of the frame part and extending cut portions of the frame part to be parallel with each other toward a center of the coupling clip, and a coupling part formed on end portions of the cut extension portions to hold the rotation shaft of the drive motor.

A portion of a circumferential outer surface of the rotation shaft may have a planar surface, and the coupling part may be formed to come into close contact with the planar surface of the rotation shaft so that the coupling part is coupled to the rotation shaft.

The planar surface may comprise planar surfaces formed on the rotation shaft at positions spaced apart from each other at an angular interval of 180°.

The frame part, the cut extension portions and the coupling part may form a single closed loop.

A locking member may be integrally mounted on the rotation member and include locking depressions formed to receive junctions between sides of the frame part. The locking depressions may be formed such that while the rotation member is in the restrained state, each time the frame part is rotated by a predetermined angle, the locking member and the coupling clip are coupled to each other.

The number of locking depressions may be larger by an integer multiple than the number of sides of the frame parts.

When the rotation member is in the restrained state, the frame part may be repeatedly deformed and restored in the locking member so that the coupling of the rotation member with the drive motor is released.

The rotation member may comprise a cooling fan for cooling coolant of an engine of a vehicle, and the drive motor may comprise a fan motor for rotating the cooling fan.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
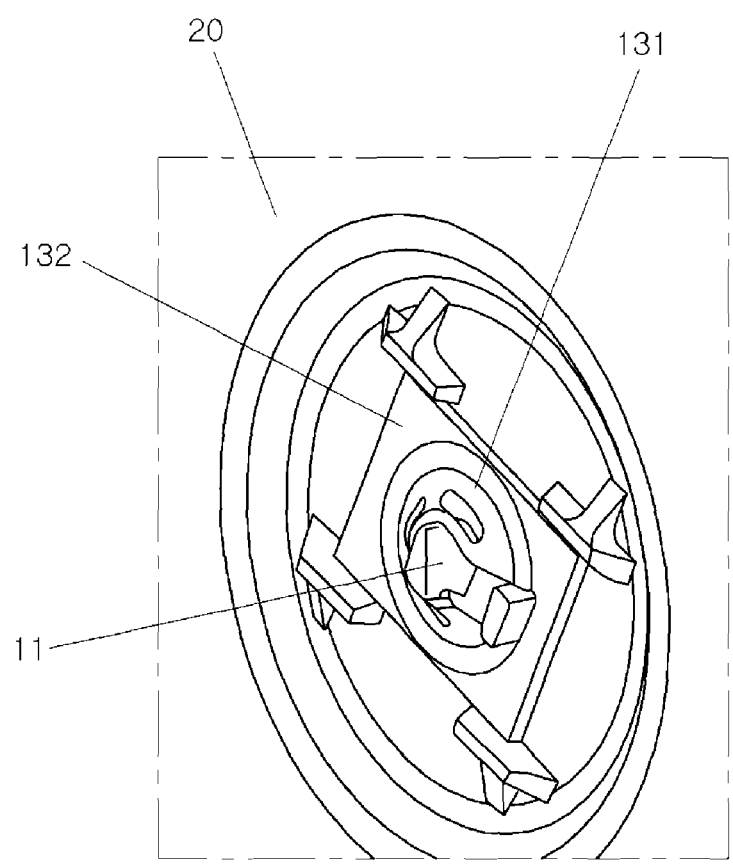
FIG. 1 is a perspective view illustrating a part on which a drive motor and a rotation member are coupled to each other according to a conventional art.
Figure 2:
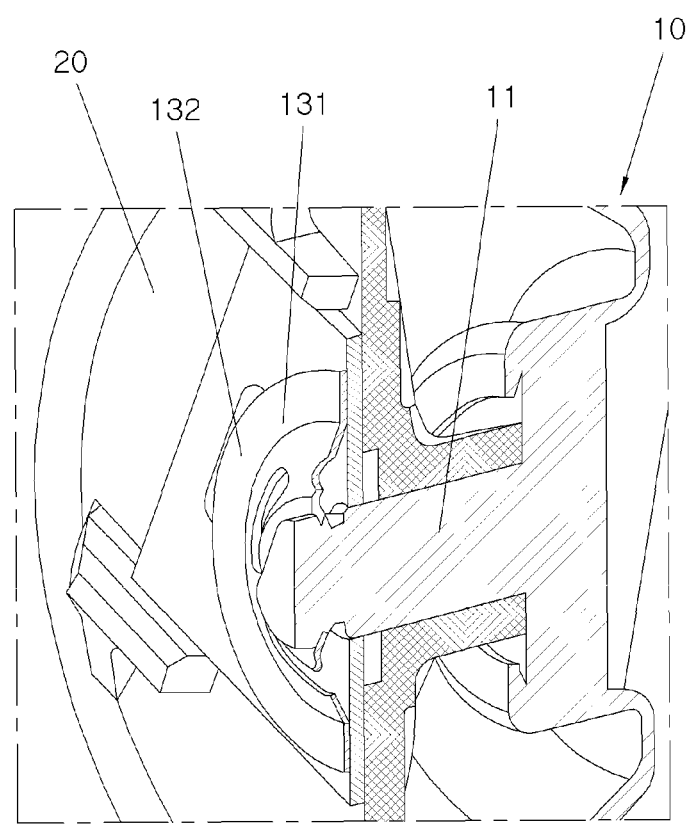
FIG. 2 is a partially broken perspective view illustrating the part on which the drive motor and the rotation member are coupled to each other according to the conventional art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described below in more detail with reference to the accompanying drawings to be easily realized by those skilled in the art.

The present invention may, however, be embodied in different forms and should not be construed as limited to the embodiments set forth herein. In certain embodiments, irrelevant to the present invention may be omitted to avoid obscuring appreciation of the disclosure. Throughout the disclosure, like reference numerals refer to like parts throughout the various figures and embodiments of the present invention.

The drawings are not necessarily to scale and in some instances, proportions may have been exaggerated to clearly illustrate various layers and regions of the embodiments. It will be understood that when an element including a layer, a film, a region, or a plate is referred to as being "above" another element, it can be "immediately above" the other element or intervening elements may also be present.

In contrast, when an element is referred to as being "immediately above" another element, there are no intervening elements present. In addition, it will be understood that when an element is referred to as being "entirely" formed on another element, it can be formed on the entire surface (or whole surface) of the other element or cannot be formed at a portion of the edge portion thereof.

Hereinafter, a drive motor capable of being separated from a rotation member when the rotation member is restrained according to an exemplary embodiment of the present invention will be described in detail with reference to the attached drawings.

With regard to the drive motor capable of being separated from the rotation member when the rotation member is restrained according to an exemplary embodiment of the present invention, the drive motor 10 which is configured to be coupled with the rotation member to transmit rotating force to the rotation member includes a power transmission control device that is provided on a junction between the drive motor 10 and the rotation member 20 and configured such that the rotating force can be transmitted from the drive motor 10 to the rotation member 20, and such that when the rotation member 20 is restrained and the rotation thereof is not allowed, the power transmission control device is elastically deformed so that the coupling of the rotation member 20 with the drive motor 10 is released and, thus, only the drive motor 10 is allowed to be rotated.

The power transmission control device is coupled to a rotation shaft 11 of the drive motor 10 and integrally rotated along with the rotation shaft 11. While the rotation member 20 is not restricted, the power transmission control device transmits the rotating force of the drive motor 10 to the rotation member 20 so that when the drive motor 10 is rotated, the rotation member 20 can be rotated along with the drive motor 10.

When the rotation member 20 is restrained and thus not allowed to be rotated, the power transmission control device is repeatedly elastically deformed and restored so that the coupling of the drive motor 10 with the rotation member 20 is released. In this way, the power transmission control device allows only the drive motor 10 to rotate while the rotation member 20 is restrained, thus preventing overcurrent from being applied to the drive motor 10.

When the restrained state of the rotation member 20 is released, the power transmission control device is restored so that the rotating force of the drive motor 10 can be transmitted to the rotation member 20 again.

Figure 3:
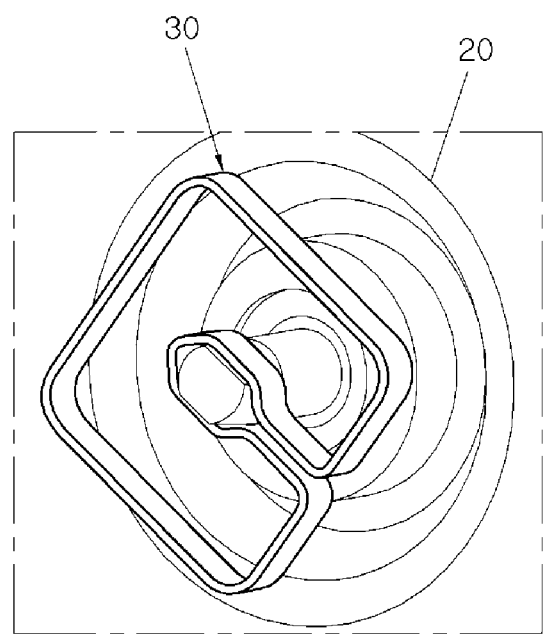
FIG. 3 is a perspective view illustrating a coupling clip coupled to a rotation shaft of a drive motor capable of being separated from a rotation member when the rotation member is restrained according to an exemplary embodiment of the present invention.
Figure 4:
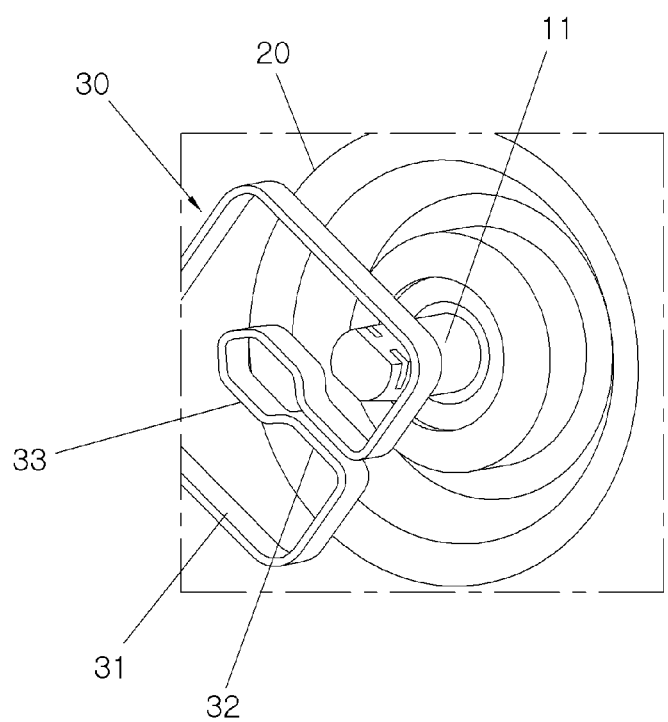
FIG. 4 is a perspective view illustrating the coupling clip removed from the rotation shaft of the drive motor capable of being separated from the rotation member when the rotation member is restrained according to an exemplary embodiment of the present invention.

FIG. 3 and FIG. 4 illustrate a coupling clip 30 as a detailed example of the power transmission control device.

The coupling clip 30 is coupled to the rotation shaft 11 of the drive motor 10 and configured such that it can be elastically deformed or restored so that when the rotation member 20 is not restrained, the rotating force can be transmitted, and when the rotation member 20 is restrained, only the drive motor 10 is allowed to rotate.

The coupling clip 30 includes a frame part 31 which has a polygonal shape and is coupled with the rotation member 20, a pair of cut extension portions 32 which are formed by cutting a portion of the frame part 31 and extending the cut portions of the frame part 31 to be parallel with each other toward the center of the coupling clip 30, and a coupling part 33 which is formed on end portions of the cut extension portions 32 to hold the rotation shaft 11 of the drive motor 10.

The frame part 31 has a polygonal shape. The frame part 31 preferably has a regular polygonal shape and is configured such that when external force is applied thereto, it is elastically deformed, and when the external force is removed, it is restored to its original shape. As shown in FIG. 3 and FIG. 4, the frame part 31 may have the form of a square that is rounded on a junction between adjacent sides.

The two cut extension portions 32 are formed by cutting a portion of the frame part 31 and extending the cut portions of the frame part 31 to be parallel with each other toward the center of the coupling clip 30. The cut extension portions 32 are configured to couple the frame part 31 with the coupling part 33, which will be explained later herein.

The coupling part 33 is coupled to the rotation shaft 11 of the drive motor 10 so that when the drive motor 10 rotates, the coupling part 33 is rotated along with the rotation shaft 11. The coupling part 33 is formed on the cut extension portions 32 in a shape in which the coupling part 33 encloses the rotation shaft 11. Preferably, to enhance the coupling force between the coupling part 33 and the rotation shaft 11, portion of the circumferential outer surface of the rotation shaft 11 has a planar surface, and the coupling part 33 is formed to come into close contact with the planar surface of the rotation shaft 11. Planar surfaces may be formed on the rotation shaft 11 at positions spaced apart from each other at an angular interval of 180°.

The coupling clip 30 has the form of a single closed loop and is coupled at a predetermined position to the rotation member 20. Because the coupling clip 30 includes metal and has a single closed loop shape, elastic deformation and restoration are allowed.

Figure 5:
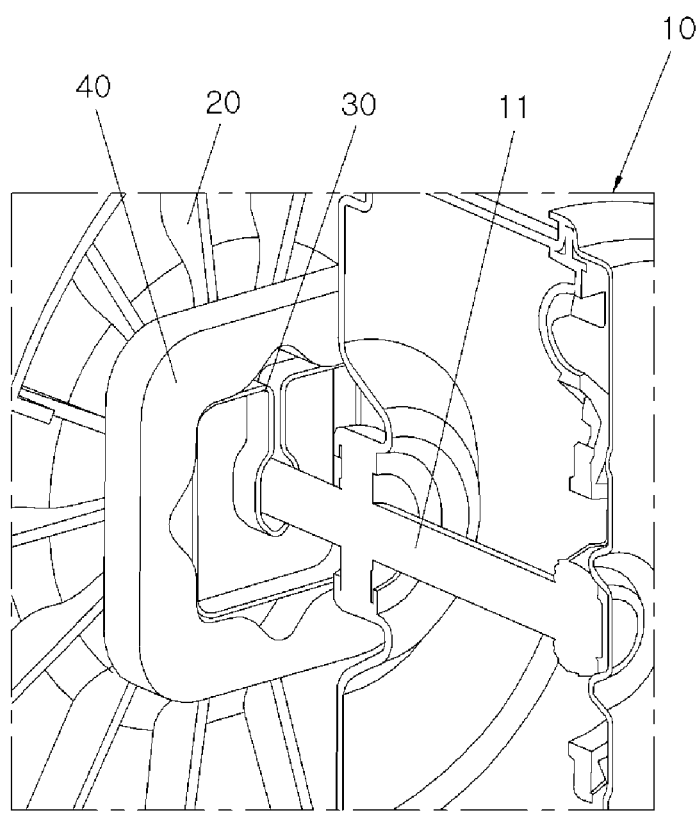
FIG. 5 is a perspective view illustrating a locking member of the rotation member that is coupled to the coupling clip for the drive motor capable of being separated from the rotation member when the rotation member is restrained according to an exemplary embodiment of the present invention.
Figure 6:
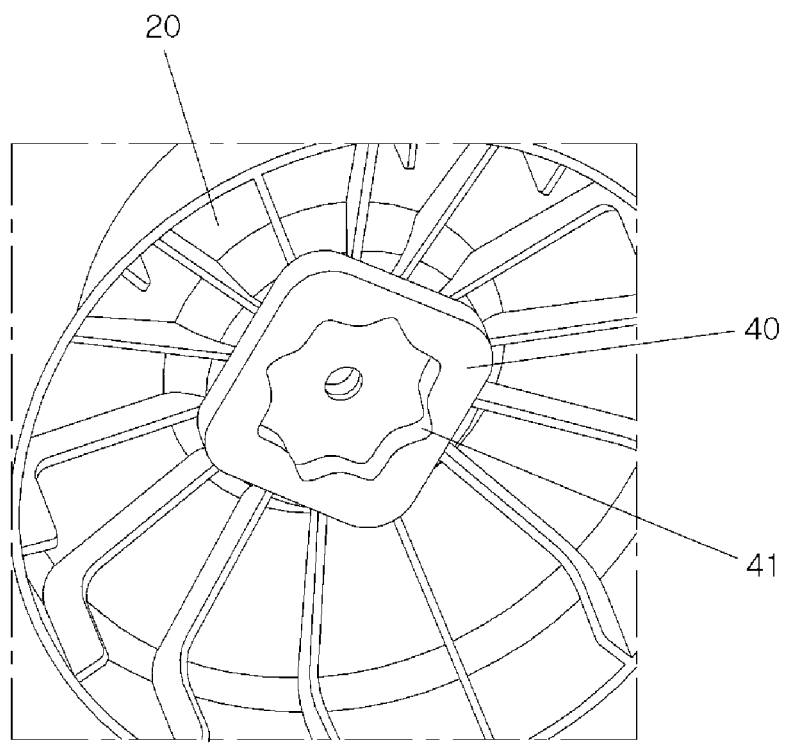
FIG. 6 is a perspective view illustrating the locking member provided on the rotation member to be coupled to the drive motor capable of being separated from the rotation member when the rotation member is restrained according to an exemplary embodiment of the present invention.

As shown in FIG. 5 and FIG. 6, the rotation member 20 includes a locking member 40 which is coupled with the coupling clip 30 and configured such that when the rotation member 20 is restrained, the coupling of the rotation member 20 with the coupling clip 30 can be released.

The locking member 40 has locking depressions 41 which receives portions of the frame part 31 of the coupling clip 30. The locking depressions 41 receive the junctions between the sides of the frame part 31 such that when the rotation member 20 is not restrained, the rotating force is allowed to be transmitted from the drive motor 10 to the rotation member 20, and when the rotation member 20 is restrained, the frame part 31 is deformed in the locking depressions 41 so that the transmission of the rotating force is interrupted.

The number of locking depressions 41 is an integer multiple of the number of sides of the frame part 31. In the drawings, there is illustrated an example in which the frame part 31 has four sides and the number of locking depressions is eight which is twice the number of sides of the frame part 31.

When the motor 10 rotates while the rotation member 20 is restrained, the coupling clip 30 is elastically deformed. When the coupling clip 30 is rotated by a predetermined angle, the coupling clip 30 is restored its original state and is locked again by the locking depressions 41.

Figure 7A:
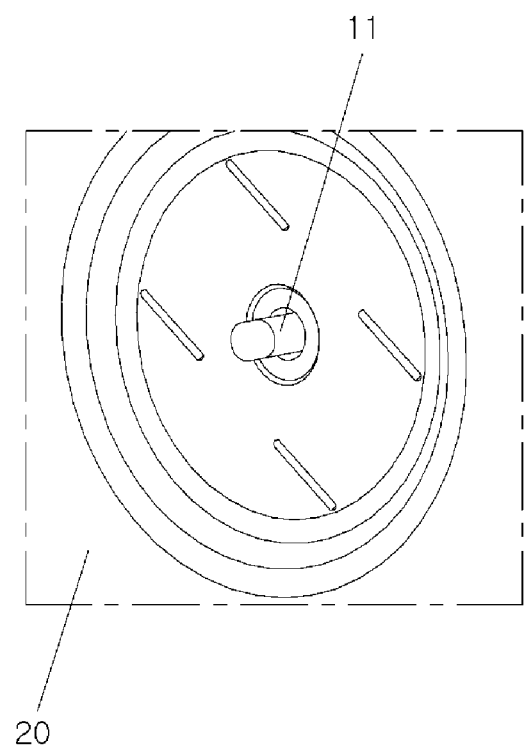
FIG. 7A, FIG. 7B, and FIG. 7C are perspective view illustrating a process of coupling the rotation member to the drive motor capable of being separated from the rotation member when the rotation member is restrained according to an exemplary embodiment of the present invention.
Figure 7B:
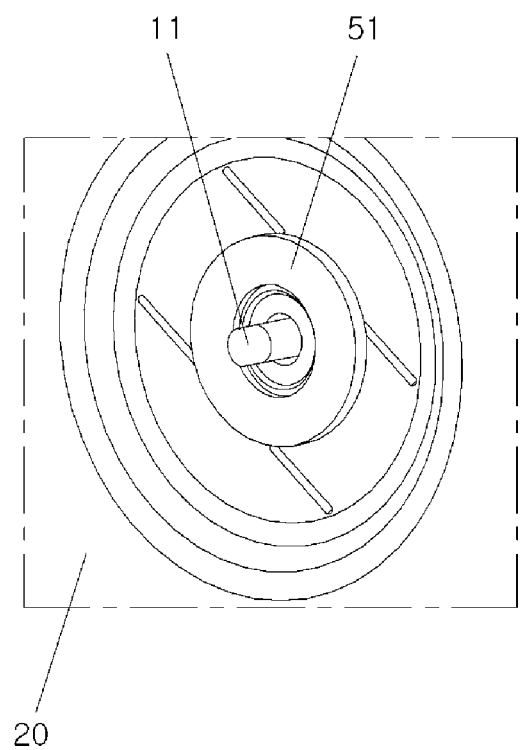
Figure 7C:
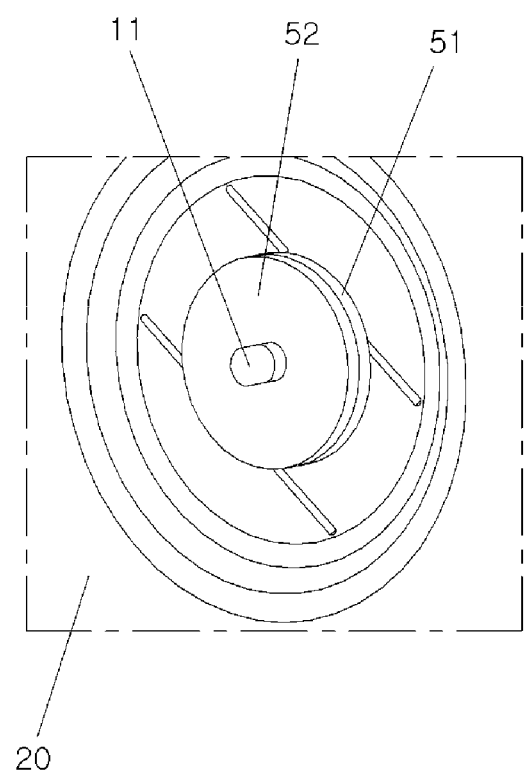

FIGS. 7A to 7C show, from the outside of the rotation member 20, a process of coupling the rotation member 20 to the rotation shaft 11 of the drive motor 10. As shown in FIG. 7A, the rotation shaft 11 is penetrated into the rotation member 20. In this state, as shown in FIG. 7B, a thrust bearing 51 is disposed around the rotation shaft 11. Thereafter, a fixing plate 52 is fixed to the rotation shaft 11 such that the fixing plate 52 makes contact with an external surface of the thrust bearing 51 (refer to FIG. 7C).

Since the thrust bearing 51 is interposed between the fixing plate 52 and the rotation member 20, the rotation shaft 11 and the rotation member 20 may be individually rotated.

Hereafter, the operation of the drive motor capable of being separated from the rotation member when the rotation member is restrained according to an exemplary embodiment of the present invention having the above-mentioned configuration will be described.

Figure 8:
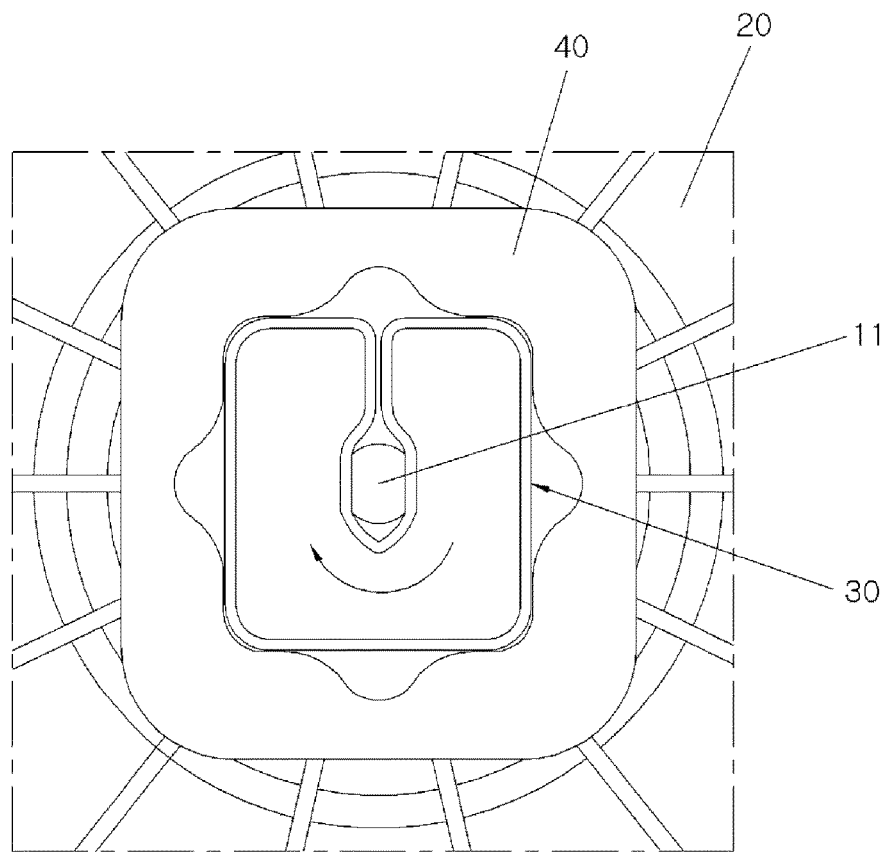
FIG. 8 is a plan view illustrating the locking member of the rotation member that is coupled to the drive motor capable of being separated from the rotation member when the rotation member is restrained according to an exemplary embodiment of the present invention.

FIG. 8 illustrates the states of the coupling clip 30 and the locking member 40 under normal conditions. In this state, when the drive motor 10 is rotated by current applied thereto, the rotating force of the drive motor 10 is transmitted to the coupling clip 30 through the rotation shaft 11.

Since the rotation member 20 is in an unrestrained state, the rotation member 20 can be rotated as the coupling clip 30 and the locking member 40 are rotated together.

Figure 9A:
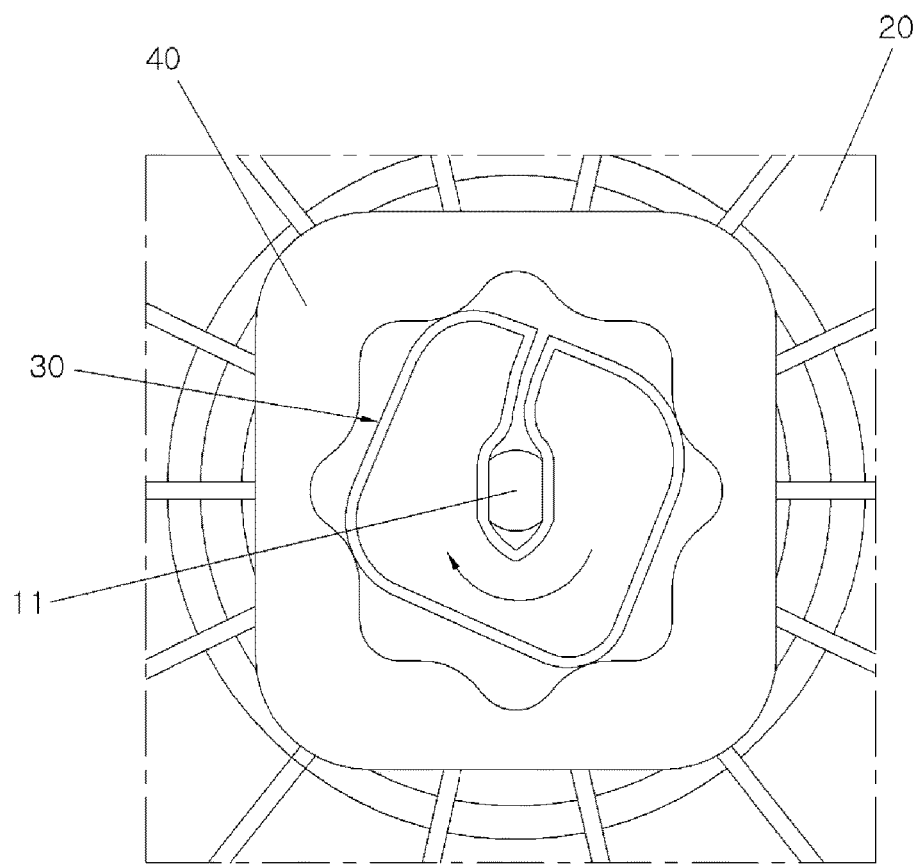
FIG. 9A is a plan view illustrating the coupling clip that is elastically deformed by the rotation of the drive motor when the rotation member is restricted after the member of the rotation member has been coupled to the drive motor according to an exemplary embodiment of the present invention.

FIG. 9A illustrates the case where the rotation member 20 is in a restrained state.

Even when the rotation member 20 is restrained, the coupling clip 30 is rotated by the operation of the drive motor 10. However, because the rotation member 20 is in the restrained state, the frame part 31 of the coupling clip 30 is elastically deformed in the locking member 40. Since the coupling of the coupling clip 30 with the locking member 40 is released by the elastic deformation of the frame part 31, the locking member 40 is maintained in the fixed state while the coupling clip 30 is rotated. Accordingly, while the rotation member 20 is in the restrained state, the coupling of the rotation member 20 with the drive motor 10 is released.

Figure 9B:
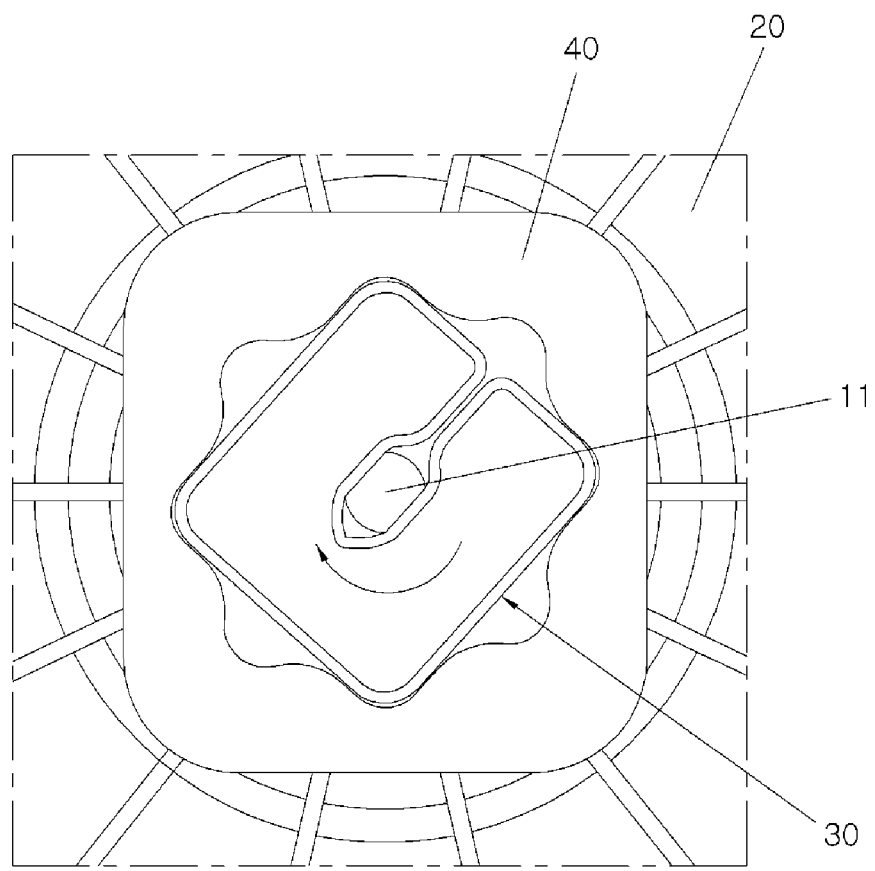
FIG. 9B is a plan view illustrating the coupling clip restored from the state of FIG. 9A.

When the drive motor 10 further rotates and thus the junctions between the sides of the frame part 31 are disposed in the locking depressions 41, the frame part 31 is restored to its original state again (refer to FIG. 9B). In this state, when the rotation member 20 is continuously in the restrained state, the elastic deformation and restoration of the coupling clip 30 are repeated such that the coupling clip 30 repeatedly enters the states of FIGS. 9A and 9B. In the instant case, the rotating force cannot be transmitted from the drive motor 10 to the rotation member 20, so that overcurrent can be prevented from being applied to the drive motor 10, whereby burning damage of the drive motor 10 or occurrence of a fire caused by the overcurrent can be prevented.

When the restrained state of the rotation member 20 is released, the coupling clip 30 enters the state of FIG. 8 again, thus allowing the drive motor 10 and the rotation member 20 to be rotated together.

In this regard, the rotation member 20 may be a cooling fan for cooling coolant of an engine of a vehicle, and the drive motor 10 may be a fan motor for rotating the cooling fan. When the cooling fan freezes, for example, in a severe cold season, overcurrent may be applied to the fan motor, thus causing burning damage to the fan motor or a fire. The present invention can overcome this problem without using an expensive circuit breaker or a pulse width modulation (PWM).

In accordance with a drive motor capable of being separated from a rotation member when the rotation member is restrained according to an exemplary embodiment of the present invention having the above-mentioned configuration, even when the rotation member is restrained, the drive motor is not restrained because the coupling of the rotation member with the drive motor can be released. Therefore, the drive motor can be prevented from being burned by overcurrent applied to the drive motor, and occurrence of a fire can also be prevented.

Furthermore, while the rotation member is in an unrestrained state, the rotating force of the drive motor can be reliably transmitted to the rotation member.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A drive motor configured for being separated from a rotation member when the rotation member is restrained, the drive motor being configured to be coupled with the rotation member to transmit rotating force to the rotation member, and comprising:
    a power transmission control device provided on a junction between the drive motor and the rotation member,
    wherein the rotating force is configured to be transmitted from the drive motor to the rotation member,
    wherein when the rotation member is restrained and a rotation thereof is not allowed, the power transmission control device is elastically deformed and the coupling of the rotation member with the drive motor is released and only the drive motor is configured to be rotated, and
    wherein the power transmission control device is coupled to a rotation shaft of the drive motor and integrally rotated along with the rotation shaft,
    wherein the power transmission control device is coupled to the rotation member,
    wherein when the rotation member is in an unrestrained state, the rotating force of the drive motor is transmitted to the rotation member, and when the rotation member is in a restrained state, the power transmission control device is elastically deformed and the coupling of the power transmission control device with the rotation member is released,
    wherein when the rotation member is changed from the restrained state to the unrestrained state, the power transmission control device is elastically restored and enables the rotating force of the drive motor to be transmitted to the rotation member, and
    wherein the power transmission control device includes:
        a coupling clip including a frame part having a polygonal shape and coupled with the rotation member, a pair of inward extension portions formed by cutting a portion of the frame part and extending cut portions of the frame part to be parallel with each other toward a center of the coupling clip, and a coupling part formed on end portions of the inward extension portions to hold the rotation shaft of the drive motor.

2. The drive motor of claim 1, wherein a portion of a circumferential outer surface of the rotation shaft has a planar surface, and the coupling part is formed to contact with the planar surface of the rotation shaft so that the coupling part is coupled to the rotation shaft.

3. The drive motor of claim 2, wherein the planar surface includes planar surfaces formed on the rotation shaft at positions spaced apart from each other at an angular interval of 180°.

4. The drive motor of claim 1, wherein the frame part, the inward extension portions and the coupling part form a single closed loop.

5. The drive motor of claim 1,
wherein a locking member is integrally mounted on the rotation member, the locking member including locking depressions formed to receive junctions between sides of the frame part, and
wherein while the rotation member is in the restrained state, each time the frame part is rotated by a predetermined angle, the locking member and the coupling clip are coupled to each other.

6. The drive motor of claim 5, wherein a number of the locking depressions is larger by an integer multiple than a number of sides of the frame part.

7. The drive motor of claim 5, wherein when the rotation member is in the restrained state, the frame part is repeatedly deformed and restored in the locking member wherein the coupling of the rotation member with the drive motor is released.

8. The drive motor of claim 1, wherein the rotation member includes a cooling fan for cooling coolant of an engine of a vehicle, and the drive motor includes a fan motor for rotating the cooling fan.

\* \* \* \* \*